United States Patent [19]
Bender

[11] Patent Number: 5,471,488
[45] Date of Patent: Nov. 28, 1995

[54] CLOCK FAULT DETECTION CIRCUIT

[75] Inventor: Carl A. Bender, Highland, N.Y.

[73] Assignee: International Business Machines Corporation, Armonk, N.Y.

[21] Appl. No.: 222,813

[22] Filed: Apr. 5, 1994

[51] Int. Cl.⁶ .......................... G11B 27/00; H03M 13/00; H04L 7/00
[52] U.S. Cl. .............. 371/61; 371/62; 307/409; 307/413; 327/44; 327/291; 327/292; 327/298; 327/299
[58] Field of Search .................... 371/61, 20.6, 67.1, 371/22.3, 4, 47.1, 2.1, 5.1, 62, 48; 327/291, 292, 298, 299, 44; 307/409, 413; 375/107

[56] References Cited

U.S. PATENT DOCUMENTS

| | | | |
|---|---|---|---|
| 3,942,125 | 3/1976 | Horiuchi et al. | 327/48 |
| 3,950,702 | 4/1976 | Saikaishi et al. | 455/161.3 |
| 4,229,816 | 10/1980 | Breidenstein et al. | 370/100 |
| 4,686,677 | 8/1987 | Flora | 371/61 |
| 4,691,126 | 9/1987 | Splett et al. | 327/526 |
| 4,800,564 | 1/1989 | DeFazio et al. | 371/61 |
| 4,864,574 | 9/1989 | Pritt | 371/61 |
| 4,920,540 | 4/1990 | Baty | 371/61 |
| 4,972,414 | 11/1990 | Borkenhagen et al. | 371/61 |
| 5,020,024 | 5/1991 | Williams | 364/900 |
| 5,081,629 | 1/1992 | Criswell et al. | 371/61 |
| 5,180,935 | 1/1993 | Abdi et al. | 307/524 |
| 5,301,171 | 4/1994 | Blow et al. | 368/46 |
| 5,313,476 | 5/1994 | Haberkorn et al. | 371/61 |
| 5,377,187 | 12/1994 | Spiotta et al. | 370/85.1 |

Primary Examiner—Robert W. Beausoliel, Jr.
Assistant Examiner—Dieu-Minh Le
Attorney, Agent, or Firm—Whitham, Curtis, Whitham & McGinn; Floyd A. Gonzalez

[57] ABSTRACT

An apparatus for transferring data between a main processor and its memory and a packet switch includes a first bus coupled to the main processor and its memory, a bidirectional first-in-first-out (FIFO) buffer coupled between the first bus and a second bus, and having a first port connected to the first bus and a second port connected to the second bus, a communications processor, coupled to the second bus, a memory operatively coupled to the second bus, a first direct memory access (DMA) engine coupled between the first bus and the FIFO buffer for transferring data between the main processor and the FIFO buffer, a second direct memory access (DMA) engine coupled between the FIFO buffer and the second bus for transferring data between the FIFO buffer and the second bus, and a packet switch interface, operatively coupled between the second bus and the switch, for interfacing the second bus to the switch, wherein packets are communicated between the memory of the main processor and the switch in accordance with the communication protocol, and wherein the first and second DMA engines transfer data for the packets independently of each other.

23 Claims, 9 Drawing Sheets

CLOCK FAULT DETECTION CIRCUIT

BACKGROUND OF THE INVENTION

1. Field of the Invention

The present invention generally relates to an apparatus for providing a communication link between a high performance packet switching mechanism and a main processor, an improved method of managing first-in-first-out buffers in the main processor, an error detection circuit of the apparatus and an improved clock fault detection circuit for the apparatus.

2. Description of the Related Art

In parallel processing systems, the system performance is dependent upon processor performance and communication performance. Communication performance is of paramount importance and is divided into two components: latency and bandwidth. Both components must be optimized to produce an efficient communication subsystem.

In conventional systems, apparatus such as adaptors have been used between a main processor (e.g., a RISC System/6000 processor or the like) and a high performance switching (HPS) mechanism. However, these adaptors require that the main processor be involved in all data movement across a relatively slow bus. Thus, while data transfer is occurring, the main processor has been unable to perform other tasks. This is a problem and does not allow optimization of the main processor.

A related problem has been that in the conventional systems, in which a coprocessing mechanism is used on the adaptor to resolve the previous concern, unnecessary traffic has been conducted across a relatively slow bus between the main processor and the coprocessing mechanism, so that not all the cycles available on that bus are used for moving application dam. This reduces the communications efficiency of the system.

Further, the conventional systems have employed polling (for communication tasks) across this relatively "slow" bus (e.g., from the main processor to the coprocessing mechanism and vice versa) which slows down the main processor and utilizes valuable bandwidth, thereby reducing the efficiency of the overall system, causing contention with application data on the bus, increasing message latency, and decreasing message bandwidth. This degrades communication efficiency.

Further, the conventional adaptor has been operable only in a slave mode. That is, it has been unable to initiate data transfers. This is a problem since the main processor must be the master (e.g., initiator) and thus, as mentioned above, must be integrally involved throughout the entire data transfer process.

Another problem is checking the routing (and thus integrity) of the data. In a parallel system using a message passing protocol, packets of information are passed between processors in the system. These data packets usually have headers which contain routing information that guide the packets from the source processor through the network fabric to the destination processor. In some systems, the route information is consumed by the network fabric (e.g., data bits are "dropped off" as they progress along the data path) so that when the message packet reaches its destination the route information no longer exists. If the route data is corrupted, the network may not detect an error and a packet could get routed to the wrong destination processor, thereby resulting in a data integrity error.

Another problem has been that the conventional adaptor may hang up the main processor indefinitely should the adaptor clock fail.

Further, conventional adaptors perform communication tasks using fixed means that are difficult to change should they prove inefficient.

SUMMARY OF THE INVENTION

It is therefore an object of the present invention to provide an adaptor which flees the processor from having to wait for communications with the high performance switching mechanism, such that the main processor can perform other tasks while the adaptor primarily performs the data transfer tasks.

Another object is to provide an adaptor between a main processor and a high performance switch which is capable of serving as a slave and as a master in data transfer operations.

Another object is to provide a method of queuing commands from the main processor to the adaptor, and responses from the adaptor to the main processor, such that polling across a relatively slow bus does not occur.

Another object is to provide a method and structure for ensuring the integrity of the data transferred.

Another object is to provide a method and structure for increasing flexibility, in controlling the interaction between the main processor and the adaptor.

Another object is to provide a method and structure for ensuring that misrouted packets are detected, even in the absence of routing data.

Another object is to provide a clock fault detection circuit in which hanging up of the main processor is prevented should the clock fail.

In a first aspect of the invention, an adaptor is provided for transferring data between a main processor and its memory and a packet switch. The adaptor includes a first bus coupled to the main processor and its memory; a bidirectional first-in-first-out (FIFO) buffer coupled between the first bus and a second bus, and having a first port connected to the first bus and a second port connected to the second bus; a communications processor, coupled to the second bus; a memory operatively coupled to the second bus; a first direct memory access (DMA) engine coupled between the first bus and the FIFO buffer for transferring data between the main processor and the FIFO buffer; a second direct memory access (DMA) engine coupled between the FIFO buffer and the second bus for transferring data between the FIFO buffer and the second bus; and a packet switch interface, operatively coupled between the second bus and the switch, for interfacing the second bus to the switch, wherein packets are communicated between the memory of the main processor and the switch in accordance with the communication protocol, and wherein the first and second DMA engines transfer data for the packets independently of each other.

A second aspect of the invention provides a method of managing data of a first-in-first-out (FIFO) buffer of a main processor coupled to a distribution mechanism by an adaptor, the main processor having a first bus and a main memory coupled thereto, the adaptor including a communication coprocessor, a second bus, and a local memory coupled thereto, and direct memory access (DMA) means for performing DMA transfers between the main memory and the local memory, the method includes the steps of: providing a set of packet FIFOs stored in both of the main memory and the local memory, each of the packet FIFOs having a head pointer and a tail pointer associated therewith, wherein any of the main memory packet FIFO and the local memory packet FIFO is a sending FIFO and the other of the main memory packet FIFO or the local memory packet FIFO is a receiving FIFO; and performing DMA transfers of packet data from the sending FIFO to the receiving FIFO, the DMA transfers including the head pointer and tail pointer information to be used at the receiving FIFO to determine when to initiate and to terminate DMA transfer of packet data without polling across any of the first and second busses for the head and tail pointer information.

A third aspect of the invention includes a clock fault detection circuit for use with an adaptor coupled between a channel of a main processor and a switching mechanism, the clock fault detection circuit including: a clock source external to the adaptor, the clock source having an output coupled to said adaptor, the clock source generating a wave having a predetermined shape (e.g., a rectangular wave); a counter mechanism in the adaptor including: a first input connected to an output of the clock source for sensing whether the wave has a predetermined level (e.g., "high"), a locally generated wave having a predetermined shape and being independent of the external source, a second input connected to the output of the clock source for sensing whether the wave has a second predetermined level (e.g., "low"), counters, clocked by a locally generated wave having a predetermined shape (e.g., a rectangular wave) independent of the external source, and being connected to the first and second inputs for starting counting from an initial value to a terminal value and an output responsive to the counter counting to the terminal value, a frequency of the counter being greater than that of the wave having the predetermined shape such that a missing clock signal transition allows the counting mechanism to reach the terminal value; and a reset device, operatively coupled to said output of the counting mechanism, for resetting the adaptor; and a reset transmitting device, operatively coupled between the reset device and the main processor for transmitting the reset condition of the adaptor to the main processor, such that the main processor avoids being left in a hung condition if a clock signal transition is missed.

In a fourth aspect of the invention, the invention provides an improved error detection circuit which includes a main processor for sending message data, the message data including parity data; a message receiving device for receiving message data; an adaptor coupled between the main processor and the message receiving device, the adaptor for receiving message data from the main processor and transmitting the message data to the adaptor; a Cyclic Redundancy Check (CRC) generator in the adaptor for generating CRC code to be transmitted at an end of the message data transmitted from the adaptor: to the message receiving device, the CRC code for detecting errors in the message dam received by the message receiving device; and a parity detector, coupled to the CRC generator, for detecting the parity data transmitted by the main processor to the adaptor, the parity detector including means for forcing the CRC generator to generate an error in the CRC code when a parity error is detected, such that the CRC code at an end of message data transmitted by the adaptor to the receiving device contains an error when the parity detector detects a parity error.

BRIEF DESCRIPTION OF THE DRAWINGS

The foregoing and other objects, aspects and advantages will be better understood from the following derailed description of a preferred embodiment of the invention with reference to the drawings, in which.

DETAILED DESCRIPTION OF A PREFERRED EMBODIMENT OF THE INVENTION

Figure 1:
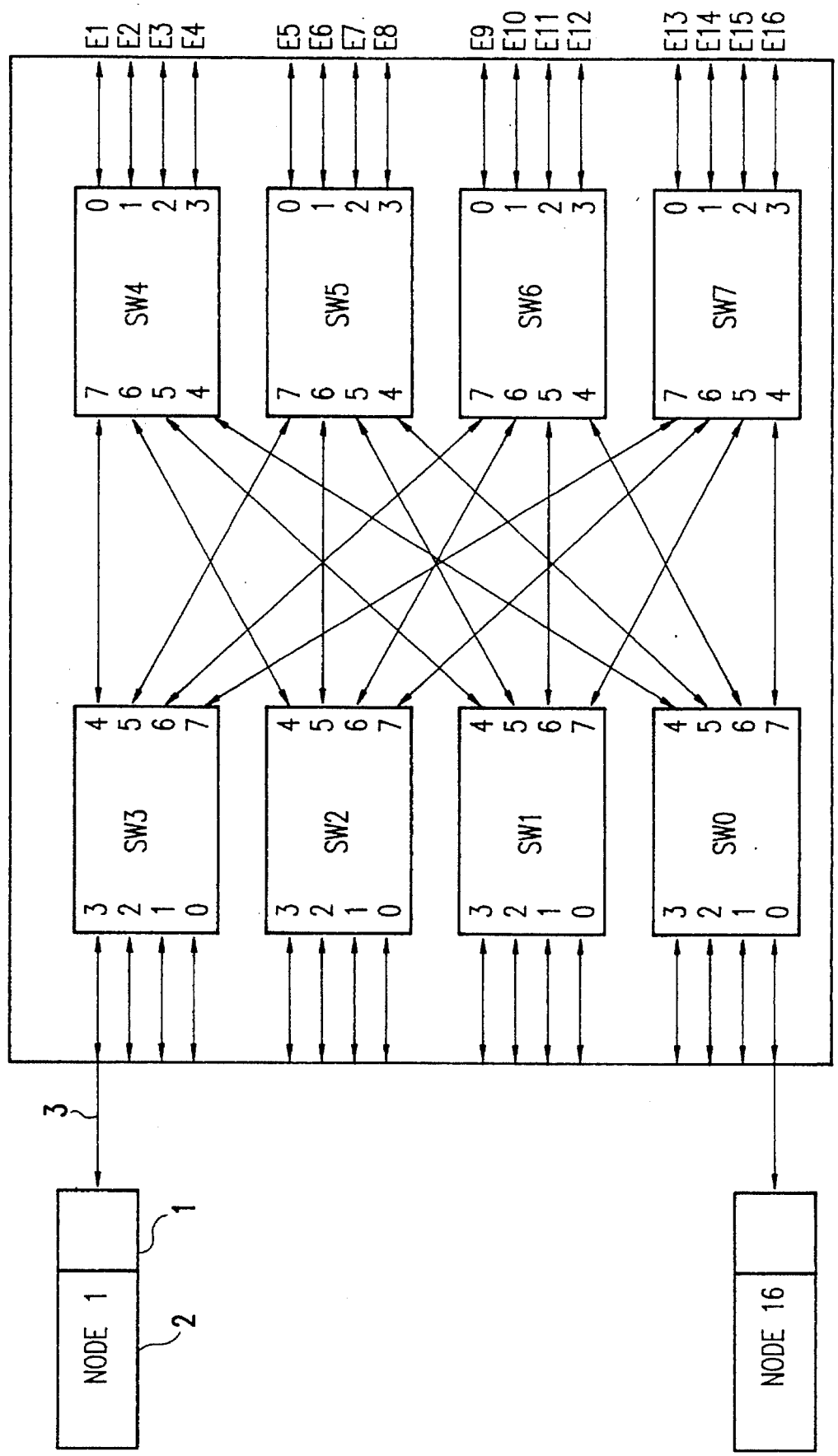
FIG. 1 is a diagram schematically illustrating the overall positioning of the adaptor between the processor and the high performance switch.
Figure 2:
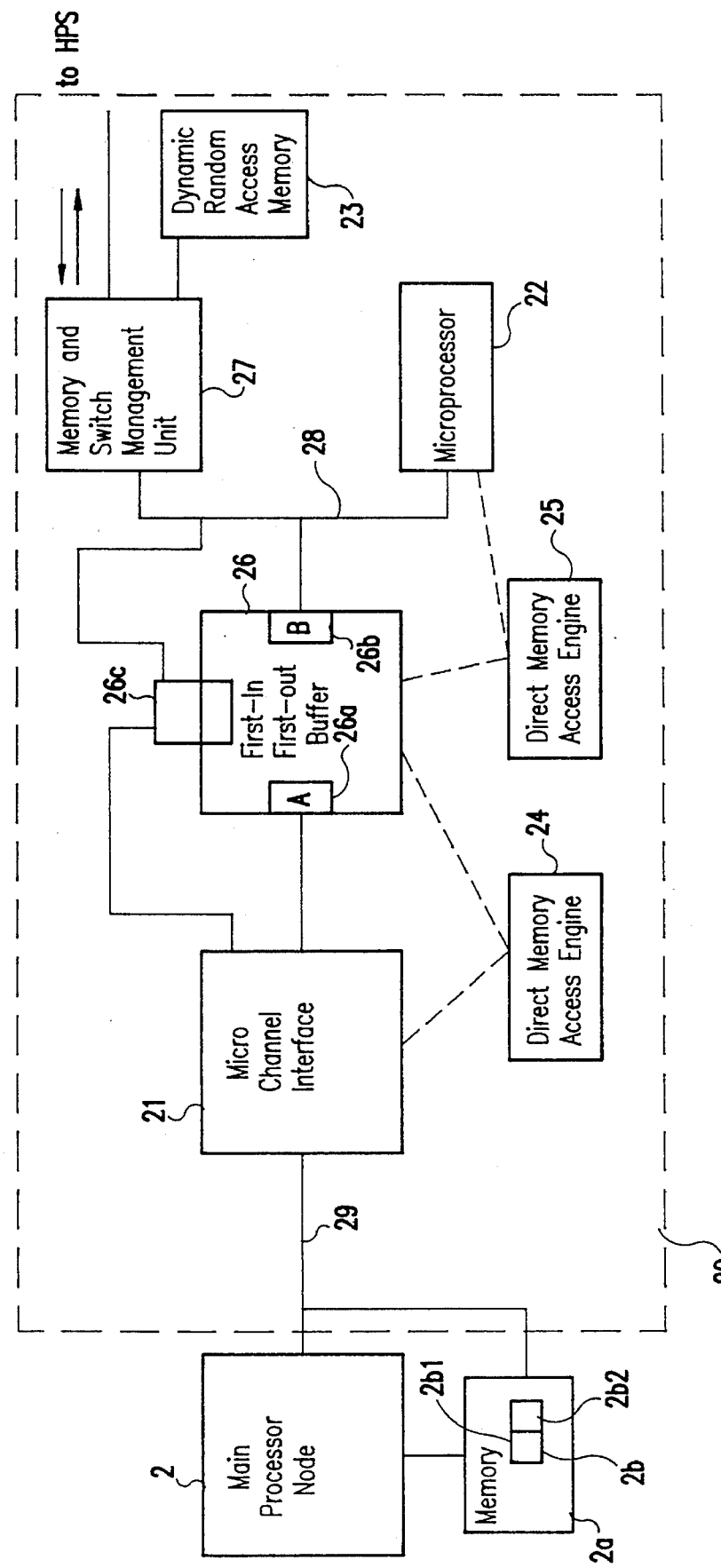
FIG. 2 illustrates the adaptor and its structure in greater detail
Figure 3:
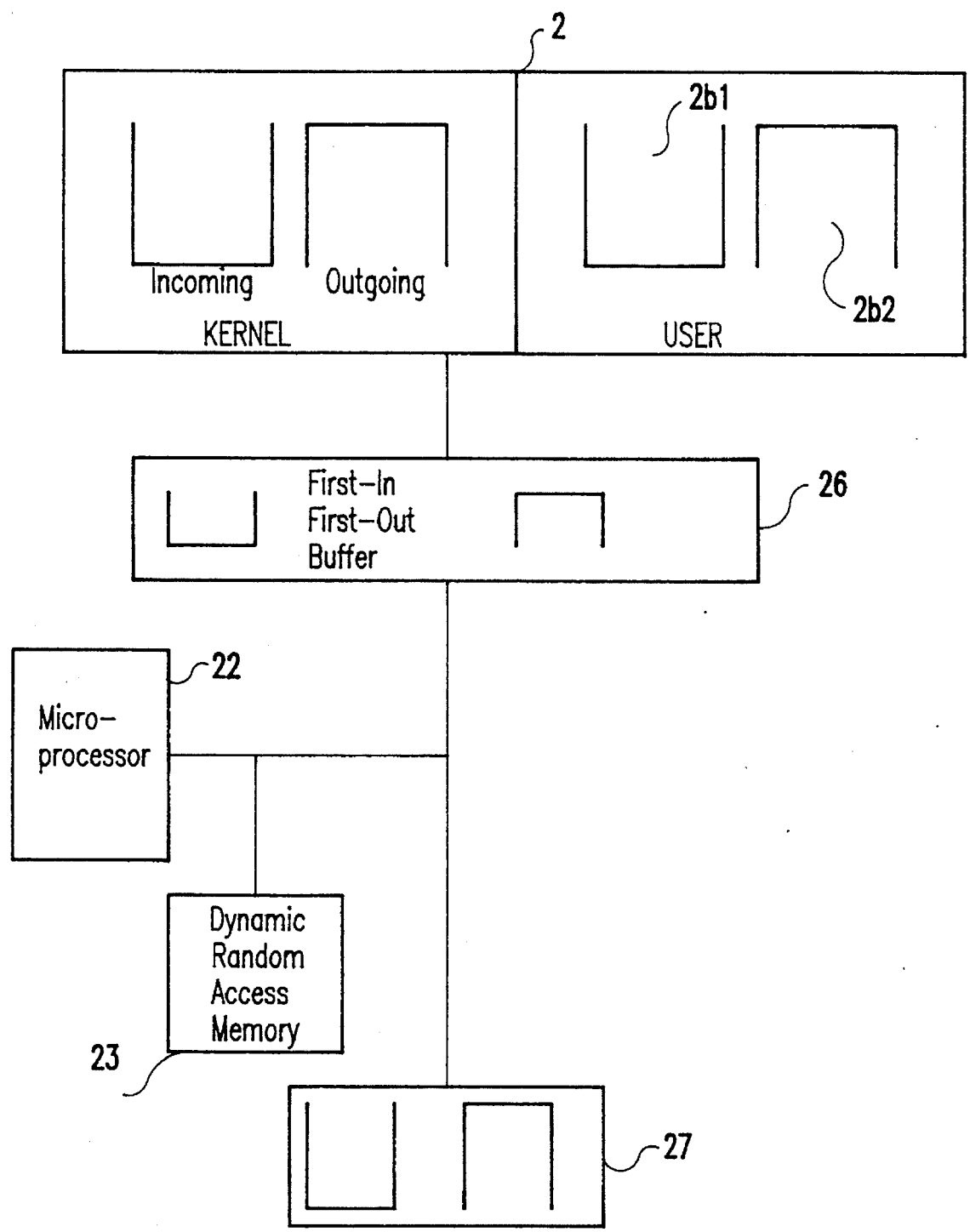
FIG. 3 illustrates the inventive system to include the sets of packet FIFOs in main memory.
Figure 4A:
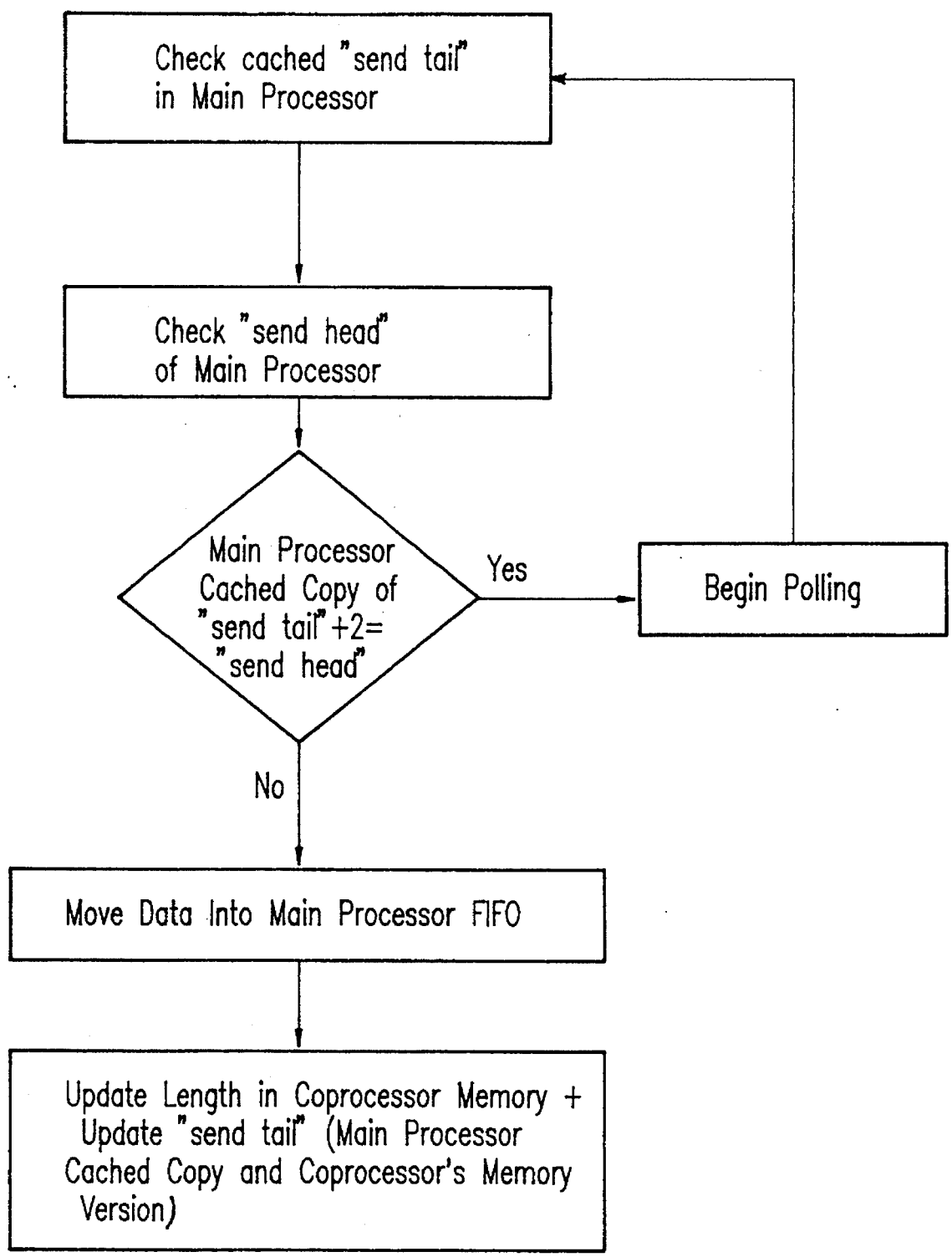
FIG. 4A–4D illustrate flow diagrams of the inventive send and receive operations by, the coprocessing mechanism and the main processor, as well the management of the packet FIFOs of the main processor.
Figure 4B:
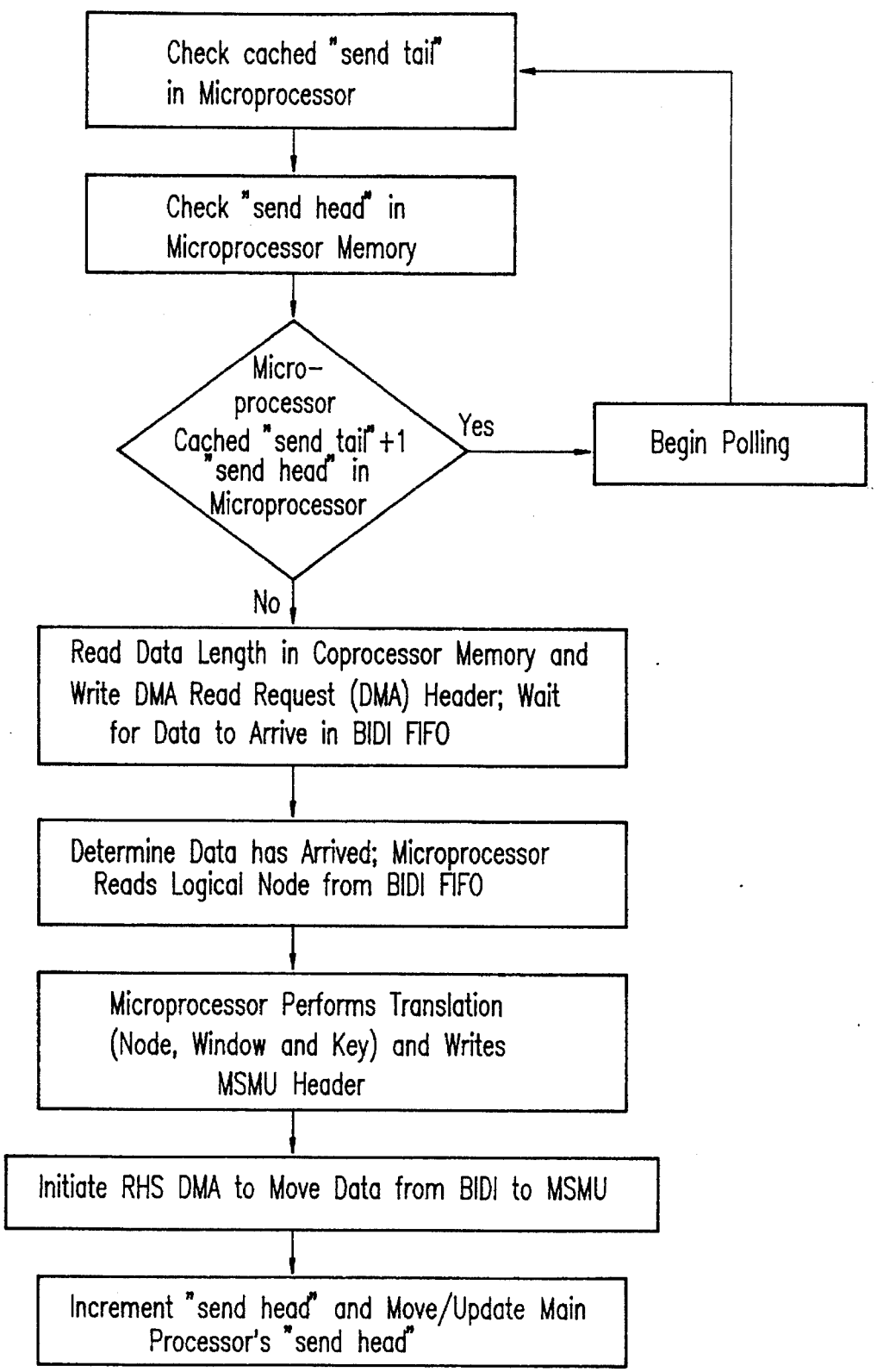
Figure 4C:
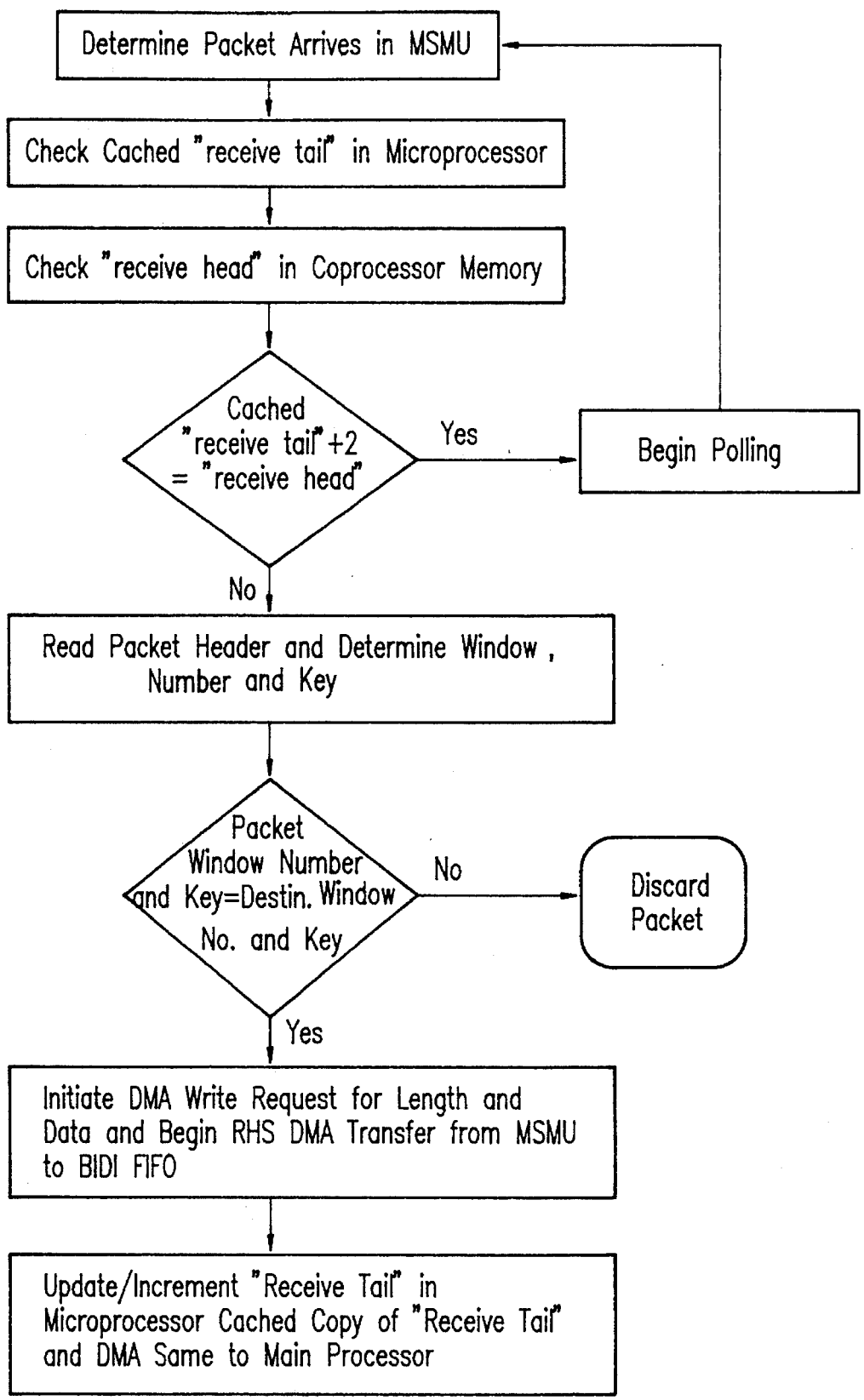
Figure 4D:
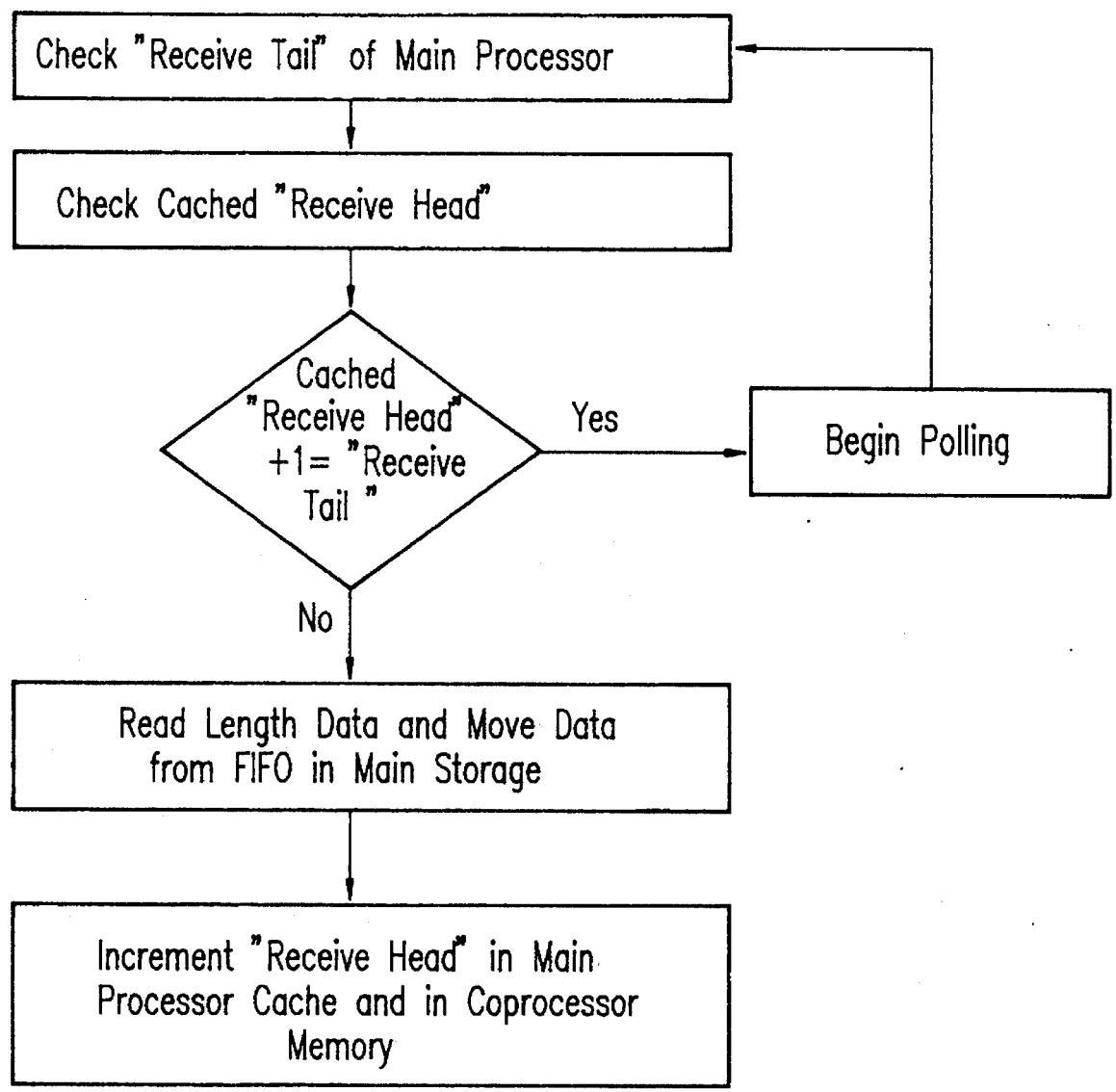

Referring now to the drawings, and more particularly to FIGS. 1–2, there is shown an adaptor 1 according to the invention. The adaptor 1 is a communications device for executing communication between a main processor node 2 (e.g., preferably a RISC System/6000 (registered trademark of International Business Machines, Inc.) manufactured by the assignee of this invention) node and a High Performance Switch (HPS) 3 (e.g., a packet switch proprietary to the assignee of the invention). The adaptor may interface to the node of a Micro Channel bus, a description of which can be found in IBM "Personal System/2 Hardware Interface Technical Reference-Architectures", Part No. 84F8933, October 1990, Part No. 68X2330 (1988) and the "IBM Micro Channel (registered trademark of International Business Machines, Inc.) Architecture", all of which are incorporated herein by reference.

FIG. 2 illustrates the adaptor 20 and its composition in greater detail. The adaptor card permits main processor machines to communicate over the HPS, communications with the adaptor being initiated by the adaptor or processor node. The card includes a Micro Channel interface 21 which interfaces a Micro Channel of the main processor to the adaptor. The main processor includes a main memory storage unit 2a including a first-in-first-out store 2b therein.

The adaptor can serve as a streaming master or as a nonstreaming slave. Specifically, the adaptor is a Micro Channel streaming master with a peak bandwidth of 80 MB/s. It supports 8- or 4-byte streaming using a 10 MHz transfer clock. The adaptor can also serve as a nonstreaming Micro Channel slave. Clock speed is preferably 40 MHz synchronous with the HPS.

Besides the Micro Channel interface 21, the card includes a microprocessor 22 (e.g., which preferably has a 64-bit data bus or the like). The microprocessor is used as a communications coprocessor.

A sufficient quantity (e.g., 8 megabytes) of error-corrected dynamic random access memory 23 (DRAM) is also provided operatively coupled to the microprocessor 22. The DRAM 23 is the microprocessor's program store and holds protocol data structures. It can also be used as a message-passing area between the adaptor and the main processor. As discussed in more detail below, it is addressable by both the coprocessor and the Micro Channel.

There are at least two direct memory access (DMA) engines (e.g., a "left hand" DMA engine 24 and a "right hand" DMA engine 25), or the like for providing direct memory access between the main processor and the duplex channel.

Further, a bidirectional ("bidi") first-in-first-out (FIFO) buffer 26 (e.g., preferably having at least a 4kB capacity) is coupled to the Micro Channel interface 21. The bidi FIFO may be controlled by the DMA engines 24, 25 (as shown by the phantom lines in FIG. 2) and includes first and second ports 26a, 26b (e.g., A and B ports). Further, as discussed in detail below, the bidi FIFO 26 has internal registers (e.g., a "mailbox") 26c by means of which the FIFO buffer can be bypassed.

A standard-cell ASIC (Application Specific Integrated Circuit) known as a memory and switch management unit 27 (MSMU) includes a plurality of registers and is operatively coupled to the microprocessor 22, the bidi FIFO, the HPS, and the DRAM 23 and serves as the DRAM controller for the DRAM 23. The MSMU 27 is the DRAM controller for the microprocessor, and it interfaces the microprocessor bus to the HPS. The MSMU is known and is described in U.S. patent application Ser. No. 08/025,019 entitled "Message Packet Transmitter", filed on Mar. 2, 1993, IBM Docket No. YO9-93-011, by Giampapa et al. and assigned to International Business Machines, Inc., incorporated herein by reference.

The MSMU can be accessed by the microprocessor or by the main processor via the mailbox. The DMA engines 24, 25 provide streaming data transfer on each of two adaptor busses 28, 29. For the left hand side, the left-hand DMA engine 24 transfers between the Micro Channel and the bidirectional FIFO buffer 22, and, for the right hand side, the right-hand engine 25 transfers between the bidi FIFO and the microprocessor bus.

The bidi FIFO 26 decouples the 160 Mbyte/s microprocessor bus 28 (e.g., the relatively fast bus) from the slower Micro Channel bus 29 permitting concurrent use of both busses. This allows data to be transferred on the Micro Channel while the microprocessor is performing computation. The high speed of the microprocessor bus relative to the Micro Channel allows computation by the microprocessor to be time-multiplexed with data transfer to and from the HPS. This provides a significant advantage over the conventional systems since the main processors are free to do other processing while waiting for the transfer.

As mentioned above and in further detail below, the adaptor can be accessed by the main processor as a Micro Channel slave or access the main processor's memory as a Micro Channel master. When the card decodes a Micro Channel address, the microprocessor is taken off its bus so that the Micro Channel master can use the bus for a cycle (e.g., a Micro Channel cycle). Thereafter, control returns to the microprocessor. Hardware provides access checking to protect system data on the adaptor from user-space applications on the main processor.

Additionally accessible to the main processor via the Micro Channel are card configurable registers (e.g., start/ stop microprocessor, reset card, establish Micro Channel addresses that the card will decode, etc.)

At power-up, the main processor loads microprocessor code into the adaptor DRAM via the mailbox and starts the microprocessor running via the configurable registers. When the right hand DMA engine or the main processor require use of the microprocessor bus, the processor is taken off the bus automatically, and is returned to the bus when the access is completed. This operation is transparent to the main processor and the microprocessor.

The microprocessor can drive interrupts to the Micro Channel and receive interrupts from the Micro Channel. Typically, interrupts are used for exception reporting. Normal message-passing, as described above and in further detail below, between the main processor and the coprocessor is done in memory.

As a Micro Channel master, the adaptor can stream data to the Micro Channel from the HPS, and to the HPS from the Micro Channel. It can also stream data from the Micro Channel to the DRAM, (and vice versa, and the microprocessor can load and store Micro Channel data. The coprocessor initiates all DMA transfers, by writes to a range of addresses on the adaptor known as the DMA ports and reads the ports later to view the results.

The left-hand-side (LHS) DMA engine is controlled by the microprocessor through a unique "header" architecture. This header travels through the first-in-first-out (FIFO) queue and thus in the bidi FIFO 26 several headers can be queued at a time) and, when the LHS finishes the previous header, it pulls the next header out of the buffer to begin Micro Channel master operations. The headers can be for LHS fetch or store operations. The data for store operations immediately follows its header in the FIFO. Thus, control and data information travel the same path. Briefly and as discussed in further detail below, the LHS/RHS bridge acts as master and slave on both busses. For example, the LHS as described above can be a master on the Micro Channel either fetching data from or storing data to the Micro Channel.

The LHS also monitors the Micro Channel for slave cycles (LHS is a slave to the Micro Channel). Slave cycles (or PIOs-processor I/O) may interrupt both LHS and RHS master operations, which thereby allow PIOs to occur quickly and atomically (e.g., in a single, unitary operation). The main processor does not have to wait for an in-progress DMA operation to finish to communicate with the adaptor and is assured that the PIO took effect. On a slave cycle decode, the LHS interrupts the RHS so that both carry out an atomic PIO into microprocessor address space. The LHS waits for a RHS acknowledgement before allowing the PIO to finish.

Further, the RHS DMA is controlled by several microprocessor slave control ports. For example, a "FIFO" port 26b (shown in FIG. 2) is provided. When the microprocessor reads/writes to the FIFO port 26b, the bridge serves as a microprocessor bus slave. The microprocessor 22 uses the FIFO port for several functions including sending headers to the LHS to do a store and begin a RHS DMA (the bridge becomes the bus master and executes pipeline cycles to/from anywhere in microprocessor address space) to put data to be stored in the FIFO; sending headers to the LHS to do a fetch; beginning RHS DMA to move LHS fetched data somewhere in microprocessor address space; sending headers to the LHS to do a store without beginning a RHS DMA; and reading or writing data directly from/to the FIFO.

The microprocessor initiates DMA transfers by writing to one of a range of adaptor addresses known as DMA ports. The choice of DMA port address and the contents of the first word written to the port, known as the DMA header, provide the microprocessor with means for controlling DMA activity. Essentially, the choice of DMA port address controls the right-hand DMA engine 25, and data in the header, which travels through the bidi FIFO 26, controls the left-hand DMA engine 24.

The port address is constituted as follows. One field of the address is the same for all port addresses. These bits indicate to the right-hand DMA engine 25 that a DMA port is being addressed. Another field specifies the address on the microprocessor bus at which transfers are to begin. An additional address bit serves as a control bit, disabling the right hand DMA engine 25 when it is zero. The purpose of this bit is described in further detail below.

The DMA header contains information useful to both the left- and right-hand DMA engines 24, 25 (e.g., the number of words to be transferred), and information used only by the left-hand DMA engine 24. This information includes the Micro Channel address at which transfers are to begin.

The microprocessor initiates DMA writes (e.g., data transfers to the main processor memory 2a from the adaptor memory or the switch) as described below. The microprocessor writes to a DMA port, implicitly indicates whether the source of the data is the memory or the switch. The header is written into the bidi FIFO 26. Thereafter, the right-hand DMA engine 25 takes the processor off the bus and transfers the data from the adaptor memory or HPS into the bidi FIFO 26. Following the transfer, control of the bus is returned to the microprocessor. When the DMA header subsequently reaches the head of the bidi FIFO 26, it is fetched by the left-hand DMA engine 24. The left-hand engine 24 performs the requested number of data transfers from the bidi FIFO 26 to the Micro Channel and discards the header.

The adaptor supports an additional mode for DMA writes. In this mode, before right-hand DMA begins, the DMA header is discarded rather than being written into the bidi FIFO. This mode is used when the microprocessor wishes to write, to contiguous locations in the main memory 2a, blocks including data from the microprocessor registers and data from the switch. Using the "headerless" mode, two or more such blocks are transferred across the Micro Channel using a single left-hand DMA.

The microprocessor performs DMA reads (e.g., data transfers from the main processor memory 2a to the adaptor memory (e.g., DRAM 23 or the switch)), as a two-step process.

In the first step, the microprocessor writes a DMA header specifying a read. It may write to any of several DMA port addresses in which the bit of the address that enables right-hand DMA is deasserted. The result of writes to any of these addresses is to place the DMA header into the bidi FIFO 26 without performing a right-hand DMA operation. When the header subsequently reaches the head of the bidi FIFO, it is fetched by the left-hand DMA engine. The left-hand engine 24 performs the requested number of data transfers from the processor memory to the bidi FIFO 26.

In the second step of the DMA read operation, the microprocessor again writes a DMA header specifying a read. However, this time the header is written to a port address with right-hand DMA enabled. This causes the right-hand DMA engine 25 to take the processor off the bus and transfer the requested number of bytes out of the bidi FIFO 26 and into the adaptor memory (MSMU) 27 or the switch. Following the transfer, control of the bus is returned to the microprocessor 22. The header is discarded and is not placed in the bidi FIFO.

If a right-hand DMA is required, the right-hand engine timings are designed such that once the microprocessor has initiated a right-hand DMA, it cannot perform another action on the bus until after the DMA transfer it initiated has been completed.

As described above, the DMA header conveys instructions from the microprocessor 22 to the left-hand DMA engine 24. This approach in which the microprocessor controls the left-hand DMA engine 24 via the FIFO 26, rather than directly, has several advantages over a conventional approach in which the left-hand port is controlled directly. For example, placing the commands into the FIFO, along with data, automatically synchronizes DMA control with the data to be transferred. Additionally, the bidi FIFO enables the microprocessor 22 to enqueue a sequence of DMA commands from the left-hand engine 24, up to the capacity of the FIFO, without waiting for the left-hand side to complete. This permits communications processing to occur concurrently with the data transfer to and from the processor memory.

Hardware in the processor node maps the Micro Channel reads and writes performed by the left-hand DMA engine 24 to reads and writes of the processor's main memory.

When the card is first initialized following power-on or reset, the left hand DMA engine 24 continuously checks its FIFO port, interpreting the first data to appear there as a DMA header, to perform data transfers on the Micro Channel, the left-hand engine must first assume Micro Channel "mastership", which entails a relatively long arbitration process. The adaptor takes several actions to minimize the effect of this arbitration delay. First, the presence of a header in the bidi FIFO will causes the left-hand side to begin the arbitration process if the engine does not currently have mastership. This arbitration begins even before the header is read from the FIFO. Thus, arbitration is overlapped with FIFO access time. As a second technique for minimizing the delays due to arbitration, the left-hand engine retains mastership of the Micro Channel as long as any data or headers remain in the bidi FIFO. It releases mastership only if the bidi FIFO is empty or if its bus rules force it to release mastership.

There is never ambiguity over which items in the bidi FIFO are headers and which are data. In the case of a write DMA, the header is followed by the data that is to be written to the main processor, the header, by specifying the transfer length, also indicates how many data words follow the header in the bidi FIFO 26. After the left-hand engine 24 has transferred the specified quantity of data from the bidi FIFO 26, it interprets the next item in the bidi FIFO as a new header. Similarly, headers requesting read DMAs stand alone. After processing a read DMA request, the left-hand engine 24 interprets the next FIFO item as a new header.

To coordinate its activity with that of the main processor 2, the microprocessor 22 must be able to monitor the process of its DMAs. Means for this operation is provided in the adaptor by two counters, DMA_pending and DMA_reply.

DMA_pending indicates how many write requests are queued in the bidi FIFO 26 awaiting completion. The count is incremented when a complete DMA write request enters the bidi FIFO (e.g., a header followed by the amount of data specified in the header). The count is decremented each time the left-hand DMA engine completes a write (e.g., after the left-hand DMA engine performs the last transfer of data specified by a header).

DMA_reply indicates how many completed read requests are queued in the FIFO awaiting transfer to the memory or the switch. It is incremented every time a request for Micro Channel read data is completed (e.g., after all the data requested in the DMA header had been put into the FIFO). DMA_reply is never decremented; the microprocessor determines how much the DMA_reply count has grown since the last time the count was checked. Watching DMA_pending decrement, the microprocessor sees it, with writes being transferred to the Micro Channel. Watching the DMA_reply increment, the microprocessor sees its read requests coming back from the Micro Channel.

This bridge not only gives the microprocessor control over how DMA is executed on the RHS and LHS, but also provides the microprocessor the capability to PIO to/from Micro Channel address space. One of the primary advantages of the present invention is that it gives the software running on the adaptor card and in the main processor enormous flexibility in dividing up communication tasks allowing development of efficient protocols.

The main processor is able to initiate communication with the adaptor and its facilities, including the switch interface, through a bus transition mechanism on the adaptor. The bus transition maps a range of Micro Channel addresses into a subset of the addresses on the adaptor microprocessor bus. This mapping gives the main processor access to all card resources that are accessible to the microprocessor except for DMA.

The data path from the Micro Channel to the microprocessor bus bypasses the FIFO, using a bypass register or "mailbox" (as mentioned briefly above and as illustrated in FIG. 2) internal to the FIFO chip. Thus, these accesses are not tended; they occur synchronously. Control signals at the bidi FIFO determine whether the FIFO path or the mailbox path is to be used. When the main processor needs to gain access to the microprocessor bus, the bus may be in use by the microprocessor or by the right-hand DMA. Adaptor logic removes the microprocessor from the bus, or suspends DMA, until data has been transferred into the mailbox on reads, or out of the mailbox on writes.

Since the microprocessor data bus is eight bytes wide, while the Micro Channel data bus is four bytes wide, Micro Channel data must be demultiplexed onto the microprocessor bus during writes, and microprocessor bus data must be multiplexed onto the Micro Channel during reads. Whether the Micro Channel with the upper or lower four bytes of the microprocessor bus is determined by the third-least-significant-Micro Channel address bit A<2>. When A<2> is high, the Micro Channel communicates with the upper four bytes and when it is low, it communicates with the lower four bytes.

The adaptor provides two alternative means for performing the multiplexing or demultiplexing of data. These alternative means, termed mode32 and mode64, differ in the number of accesses performed on the microprocessor bus. In mode32, one access takes place on the microprocessor bus for every Micro Channel access. In mode64, one microprocessor access occurs for every two Micro Channel accesses.

mode64 implies that data is accumulated in the mailbox registers before being sent from one bus to the other. mode32 is convenient for accesses to adaptor memory and to most registers on the cards. It fails for reads and writes to an eight-byte-wide FIFO internal to the switch interface logic, and for these accesses mode64 must be used mode64 requires that the main processor perform adaptor accesses in pairs, with Micro Channel address of the first access eight-byte-aligned and the second address contiguous to the first. Selection between mode32 and mode64 is made dynamically by the main processor, based on the Micro Channel address it uses for the card.

The main processor 2 can also access configuration registers on the card that are not accessible to the microprocessor 22. These registers are used to initialize the adaptor, to give it Micro Channel addressability, and to selectively enable or disable miscellaneous other Micro Channel-related features such as parity and Micro Channel streaming.

Main Memory FIFO Management

Looking at management of the FIFOs in the main memory of the main processor and the management thereof in greater detail and again referring to FIG. 2 and FIGS. 4A–4D, switch packets are moved to/from the adapter using DMA operations on sets of packet FIFOs 2$b$ 1, 2$b$2 stored in main system (e.g., RISC System/6000 processor) storage. One set of FIFOs is for kernel and one set of FIFOs is for the user.

One FIFO in each packet FIFO set is for outgoing packets and a second FIFO in each of the packet FIFO sets is for incoming packets. The management of these two FIFOs is distributed between the main processor 2 and the microprocessor 22 (hereafter alternatively referred to as the coprocessor) in a novel way and allows unexpectedly superior advantages.

At a high level, the main processor on the outgoing side will move the packet into its outgoing FIFO and will inform the coprocessor by putting a message into its memory and the coprocessor will use its hardware to move the packet to the MSMU.

On an incoming packet to the main processor 2, the coprocessor 22 recognizes that the packet has come in, looks at the header of the packet and decides where to move it and uses its hardware to move the packet. In the coprocessor's memory 23, there is control information which mirrors the send FIFO (e.g., the length of the packet).

As mentioned above, the communication coprocessor and the main processor are separated by a relatively slow bus. Each processor has its own local memory on its own fast local bus but also has access across the slow bus to the other processor's memory. To avoid unnecessary traffic across the slow bus so that nearly all the cycles available on that bus are used for moving application data, the present invention uses a FIFO management scheme which avoids polling across the slow bus (which slows down the main processor and utilizes valuable bandwidth), thereby increasing the efficiency of the overall system.

In the invention, each FIFO of the main processor has a head and tail pointer associated with it. When data is put into the FIFO, the tail pointer is incremented and when data is taken out of the FIFO the head pointer is incremented. In the inventive design, both FIFOs are stored in the main processor's memory where it is most readily used by the application. However, rather than also store both the head and tail pointers in the main processor's memory as is conventional practice, the inventive design distributes the head and tail pointers between main processor memory and coprocessor memory to avoid polling on this control information across the slow bus.

Generally, in the case of the outgoing FIFO, the tail pointer is stored in the coprocessor's local memory and the head pointer is stored in the main processor's local memory. Also, the main processor keeps a cached copy of the tail pointer since it is the only processor which updates it and the coprocessor keeps a cached copy of the head pointer since it is the only processor which updates it.

The FIFO queue can be analogized to a circular queue having a plurality of entry positions and in which the head of the FIFO points to one position and the tail points to another position depending upon the amount of data in the queue. As information is put in the queue (FIFO), the tail is incremented, whereas when information is taken out of the queue, the head is incremented. All arithmetic on the head and tail is modulus the size of the FIFO.

For a data send operation by the main processor 2, when the main processor is ready to send a packet (e.g., a packet being an entry in the FIFO and being organized into packet flames), it first polls the head pointer in its local memory and compares it with its cached value of the tail pointer to determine if there is space in the outgoing FIFO (e.g., checks to see if the tail pointer (+2) is not equal to the header pointer). If there is space in the outgoing FIFO, the main processor 2 will write the packet into the FIFO and writes an updated tail pointer into the coprocessor's local memory. The coprocessor has a cached value of the head pointer. The coprocessor polls for outgoing packets by comparing its cached value of the head pointer with the tail pointer value stored in its local memory. For incoming packets, the tail pointer is stored in the main processor's local memory, the head pointer is stored in the coprocessor's local memory, and the operation of receiving packets is symmetric with the send operation.

In the standard implementation where both the head and tail pointers are stored in the main processor's local memory polling by the coprocessor would be across the slow bus, thereby causing contention with application data on the bus and increasing message latency due to an increase in polling delay. Such a problem is avoided by the structure and method according to the invention.

FIFO Send Operations

The coprocessor has a cached copy of a "send head" and periodically updates it when it updates the "send head" in the main processor's memory. Further, in every packet, along with the length, preceding the data is a double word which contains the logical node number and the route number so that when the coprocessor DMA transfers the packet, in the bidi FIFO 26, the first item will be the node number and the route which the coprocessor will read out and put into a register. It uses this data to look up in a table to find the key, the window (which is related to the kernel and user and thus allows the adaptor to know which FIFO to put the data in) and the real (physical) node number of the target of this packet.

The key is sent to the destination to verify that the data came from a valid source. The logical node number is translated into a real node number and then there is a second translation to determine the route.

Thus, regardless of what task number the user specifies, the node and route information ensure that the data gets to the right destination (node) or is marked invalid in the case of a wrong task number being specified. Thus, the user can only access authorized addresses and nodes are protected from receiving spurious data.

For a main processor "send data" operation, the main processor 2 first checks to determine if its cached copy of the "send tail" (+2) is not equal to the "send head" stored in its own memory and updated by the coprocessor (e.g., FIFO is not full). If equal, polling occurs internally (e.g., locally, the main processor reads the "send head" and compares it to its cached "send tail"; the main processor does not have to go out across the slower, Micro Channel bus) until the "send tail" is not equal to the "send header" and thus the FIFO is not full. When the coprocessor takes data out of the FIFO, the main processor will know immediately (e.g., within one transaction) that there is room in the FIFO and thus polling will be very rapid and there is no interference with DMA.

Thereafter, the main processor moves data into the FIFO (at the "send tail" position of the FIFO) in the main storage of the main processor. Additionally, the logical node and route are moved into the FIFO slot. Thereafter, the main processor updates the length in the coprocessor's memory 23 and updates the "send tail" (both its cached copy and the coprocessor's memory version).

For a coprocessor "send" operation, the coprocessor 22 begins with polling to check the coprocessor's "send tail" in its memory, to thereby determine whether the receiving FIFO is not empty. Thus, the coprocessor determines whether the cached "send tail" (+1) is equal to the "send head". If it is equal, then polling continues until the "send tail" (+1) is not equal to the "send head". The coprocessor updates its own "send head" (as well as that of the main processor 2 by a DMA operation), which makes the process much more efficient since the main processor need not update the "send head".

Thereafter (once it has been determined that there is data to send), the coprocessor 22 reads the data length (in DRAM; the length being put in the DRAM by the main processor) and writes a DMA read request (DMA header) to the DMA port 26b on the adaptor to initiate a DMA read request which tells the left hand side DMA engine 24 to fetch the packet from the outgoing FIFO of the main processor and to move the packet into the bidi FIFO. Then, the coprocessor waits for data to arrive in the bidi FIFO. As soon as the data arrives, the coprocessor reads the logical node from the bidi FIFO and performs a translation (e.g., node, key and window) and writes a MSMU header (node, key, window and length). The coprocessor initiates the right hand side DMA to move data from the bidi FIFO 26 to the MSMU 27. Thereafter, the coprocessor increments its own cached copy of "send head" and moves/updates (via DMA) the "send head" in the main processor's memory.

One of the significant feature of the invention is that, with the adaptor of the invention, while the system is polling the bus is unaffected since all of the polling is conducted locally (e.g., by the main processor or the coprocessor) and thus the invention prevents having to go across the bus mainly used for transfer of data. Hence, such data transfer is optimized by the invention. Further, the "send head" and "send tail" refer to positions in the main memory, although the coprocessor need not go back to main memory to find out where the data is.

Receive FIFO Operations

For receive FIFO operations, a "receive tail" and a "receive head" are utilized.

For coprocessor receive operations, first, a packet arrives in/on the MSMU and thus a receive operation begins on the coprocessor. The coprocessor's cached "receive tail" is compared to the "receive head" in the coprocessor's memory 23 (e.g., a check is performed of the Receive FIFO). Polling is conducted locally if the cached "receive tail" (+2) is equal to the "receive head" until the two do not match. Thereafter, the coprocessor 22 reads the packet header and the packet header is checked for window number and key (and key partition identification), to determine whether the task/source is valid and whether the coprocessor can talk to the node. If there is no match between the key (and key partition identification) and the window number of the incoming packet and that of the destination, then the packet is discarded and the invalid reception is logged. The window is used to distinguish between the two sets of packet FIFOs in main memory of the main processor.

If there is a match, the coprocessor moves the packet up to the main processor by initiating a DMA write request for the length (in the coprocessor) and the data and starts the right hand side DMA engine data transfer from the MSMU 27 to the bidi FIFO 26. (This operation is advantageously performed in the alternative mode discussed briefly above in which the length and the data are moved, partially by the coprocessor and the rest by the DMA engine.) This allows further optimization of the bus across the micro channel.

Concurrently (e.g., with the arrival of the packet in the bidi FIFO 26), there is a check of the receive FIFO (in the main processor memory) to ensure that it is not full. Thus, the cached "receive tail" (+2) is compared to the "receive head" (e.g., they are not equal) to ensure that they are not equal. If it is full, local polling occurs at the coprocessor. While there is polling is occurring, the main processor can send a new "receive head" through the adaptor to thereby update the "receive head" in the coprocessor 22.

After the data has been sent to the receive FIFO, the "receive tail" in the coprocessor's cache is updated/incremented and the "receive tail" is transferred via DMA up to the main processor 2. The "head" and the "tail" refer to the FIFO in main processor memory 2a, and the coprocessor is controlling what packets are placed in the main processor memory. The main processor controls what packets are taken out of the main processor memory (FIFO). The main processor will not try to read a packet until it has received the entire packet and is told that the packet is available for reading. Thus, there is no need for polling across the Micro Channel to find out if a packet is present, but instead only local polling and looking at local memory (e.g., the coprocessor's or the main memory).

While the above send and receive operations have been serially (e.g., sequentially) described for ease of understanding, the send and receive operations using the bidi FIFO may be performed concurrently and there is arbitrary interleaving of the above operations. Indeed, the structure of the invention makes it possible to receive another packet midway through a send operation and vice versa.

Main Processor Receive Operations

For main processor receive operations, the main processor compares its "receive tail" to its cached "receive head" (e.g., stored in the cache of the main processor). If the "receive tail" (+1) is not equal to the cached "receive head", the process continues as described below. Otherwise, local polling is conducted until the "receive tail" (+1) is not equal to the cached "receive head". Thereafter, the main processor reads the length of the data (the length data being stored in the coprocessor's memory) and the data is removed from the FIFO. The main processor increments/updates the "receive head" in its cache and in the coprocessor's memory.

As described above, a primary benefit of such operations (as made possible by the invention) is that neither the main processor nor the coprocessor 22 has to poll across the slower bus. Instead, local polling (e.g., internally looking) in their own memory occurs. This is advantageous in that a more efficient system results.

Error detection

A unique combination of data parity and CRC code generation provides a reliable data path from Micro Channel through HPS.

Figure 5:
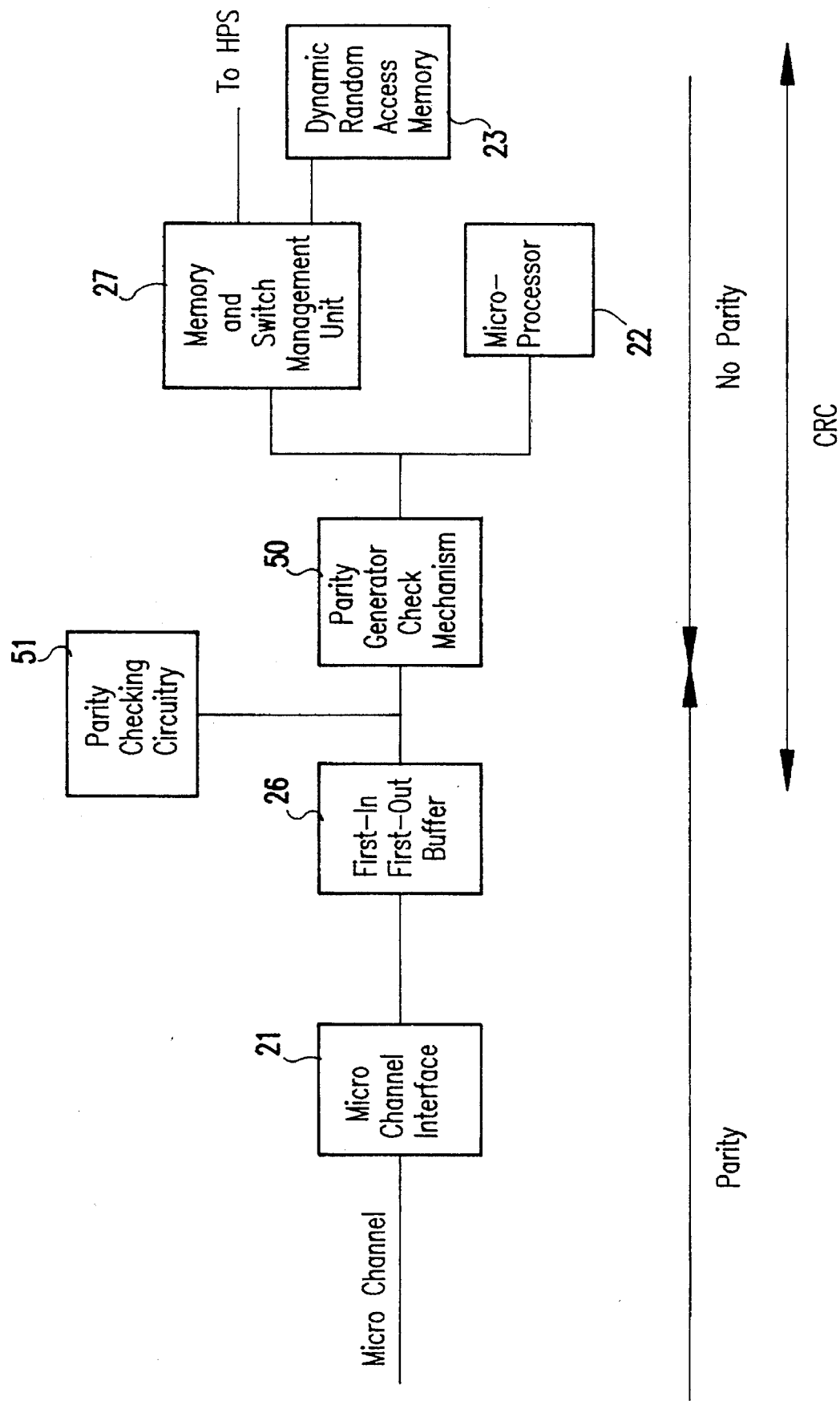
FIG. 5 illustrates the structure for ensuring the integrity of the data transferred by the adaptor according to the invention and more specifically illustrates the structure for performing parity/CRC error detection.

Referring to FIG. 5, the adaptor provides parity generation/checking structure on Micro Channel addresses and data, which includes a parity generator/check mechanism 50. Parity is generated and checked as shown below. A single bit enables/disables all parity checking-slave and master, address and data. Parity is not supported by the microprocessor 22 or the MSMU 27. When these chips source dam, parity is generated on their data bus and is checked at the destination by Micro Channel parity-checking circuitry 50. When the Micro Channel generates parity, it is checked immediately before the microprocessor data bus. The bidirectional FIFO 26 is part of the parity-checked data path. Address parity is checked at decode for slave accesses and, as specified by the main processor's Micro Channel architecture, if parity is bad the card does not return a response on the Micro Channel (CD SFDBK remains inactive). Also, no cycle is begun on the microprocessor bus.

On Micro Channel slave writes, only those bytes are checked whose enables are active, which is dictated by the Micro Channel specification. For master accesses, Micro Channel address parity is, like data parity, generated on the microprocessor bus and checked at the destination by the main processor's parity circuitry on the Micro Channel. Addresses on the microprocessor bus (such as those generated by the right-hand DMA engine 25) are not checked by the microprocessor 22 or MSMU 27.

The adaptor generates and checks the CRC code on each MSMU message packet. This preferably includes coverage on the packet header, route word (node id), and message body.

The adaptor's CRC (e.g., an error detection algorithm) monitors the data on the FIFO B data bus and generates a CRC code (e.g., preferably 16-bit). The adaptor card provides parity checking on the data from the microchannel up to and including the FIFO B bus, and CRC checking on the data from the FIFO B bus out through the HPS. This provides full error detection on the data from the microchannel to the HPS (in both directions).

The CRC logic 51 includes two accessible registers (e.g., a node id register set by code at adaptor initialization and a CRC check register preset at a time before a packet header is sent or received). In one embodiment, error detection is preferably performed as follows.

On MSMU packet send, the microprocessor 22 will write the 4-byte packet header to the MSMU header register and will also put the destination node id into the high order part of the double word. This node id will be ignored by the MSMU 27 but will be used in the CRC check generation.

The microprocessor 22 will then write the route to the MSMU data register. This double word will be ignored by the CRC logic 51. The microprocessor will initiate writing the message packet body to the MSMU, data register. The message body can be written directly by the microprocessor, DMA'ed, or a combination of microprocessor and DMA. The CRC will encode all message data transferred into the CRC check register. The microprocessor will then read the CRC_CHECK register and write the checkbits to the MSMU trailer reg bytes 0 and 1. These must be the last bytes in the packet.

On a MSMU packet receive, the microprocessor will read the 4-byte packet header from the MSMU header register. The CRC logic will insert its node id register into the high order part of the double word for CRC checking. If the receiving card's node id register does not match the destination node id used when sending the packet, a CRC fault will occur. This will happen if, for example, a route bit is dropped and the packet ends up at the wrong node.

The microprocessor 22 will then initiate reading the message packet body from the MSMU data register. The message body can be read directly by the microprocessor, DMA'ed, or a combination of microprocessor and DMA. The CRC 51 checks all message data transferred.

The microprocessor then reads the trailer from the MSMU trailer register. The microprocessor reads the CRC check register to check for an error on the receive. If an error is detected, then the packet should be discarded.

For adaptor card parity errors, if the adaptor detects a parity error the CRC register will be forced to a fixed value until the next CRC check register read. This guarantees a CRC error on the receiving node if the sending node detected a parity error while the send was in progress and the trailer read. If the receiving node detects a CRC error and the trailer.crc was the fixed value sent when a parity error is detected on a send, then the sending node most likely had a parity error. Except for this case, the code normally has no reason to look at the trailer.crc.

Of course, the same effect can be achieved using other methods which come within the scope of the present invention and thus the embodiment above is merely exemplary.

Figure 6:
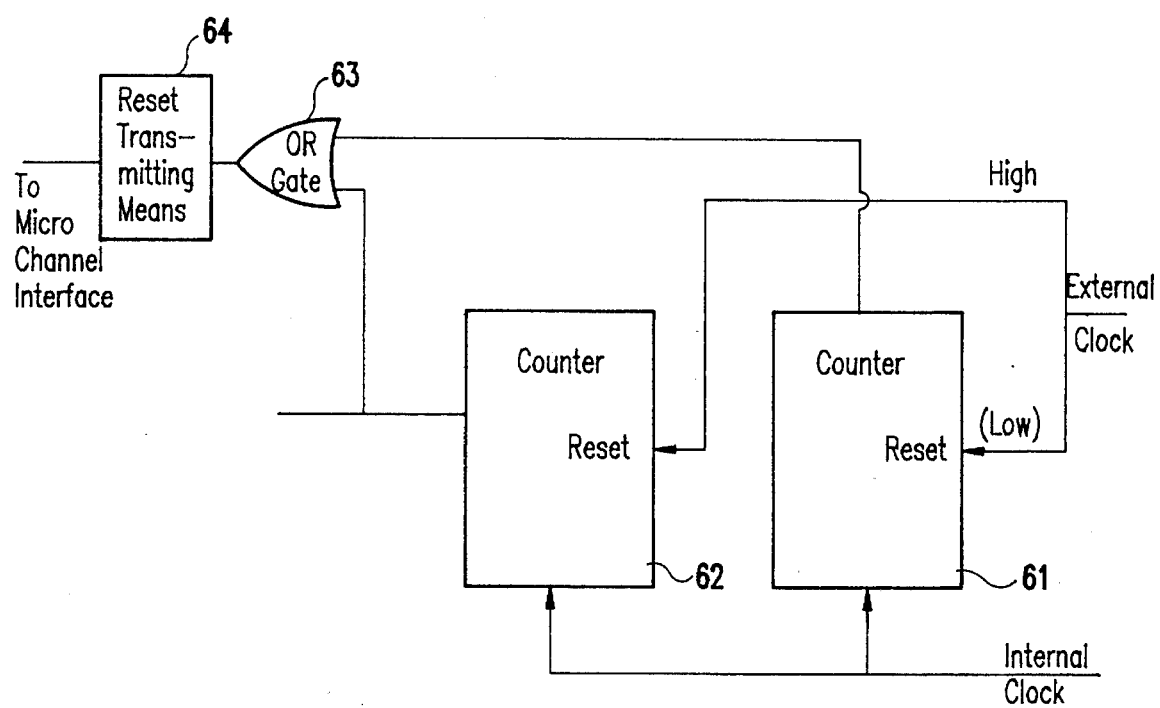
FIG. 6 illustrates the clock circuit according to the invention.

Further, referring to FIG. 6, the apparatus according to the invention provides a mechanism which detects a missing clock and thereby prevents processor node hang-ups.

Generally, the clock for the adaptor (and all of the plurality of adaptors which are employed in the system and the HPS) is provided by a single source clock for the synchronization of the data across the switch to the main processor. If the source clock is lost, the card could hang-up the Micro Channel and as a result the entire node. As illustrated in FIG. 6, the clock detection circuit according to the invention uses logic to create an oscillator which runs a pair of counters 61, 62. These counters are alternately reset by the high and low states of the source clock generated wave having a predetermined shape (e.g., the wave has a rectangular shape). A missing clock allows at least one of the counters to reach terminal count which causes the rest of the card to be held reset. This may cause a Micro Channel bus error which the software can detect and then go investigate the card (using Programmable Option Select (POS) registers) to see that the clock is missing.

Looking at the clock detection circuit according to the invention in greater detail, the clock comes in from the external source with the data. It is possible that the clock would be interrupted in which case the main processor may be hung up indefinitely. Several scenarios are envisioned and have been problematic in the conventional systems. Such conditions should be avoided and prevention of such conditions is affirmatively provided for by the inventive clock circuit.

The Micro Channel transfers have been described above in which the adaptor is performing as a slave. In the slave mode (e.g., when the adaptor is performing as a slave to the main processor), the main processor initiates the read or write operation by putting an address on the Micro Channel Bus. The data transfer is then effected by exchanging a series of handshaking signals (as defined in the Micro Channel specification mentioned above and incorporated herein by reference). If the clock is not present, the transfer may be started, but will never finish, thereby hanging the Micro Channel and thus the main processor (the proper handshaking will not occur) would never finish.

According to the invention, if there is no clock on the adaptor, then the adaptor is reset (thereby not allowing the cycle to start) and thus the main processor will not hang up.

Similarly, if the operation is in the middle of a transaction cycle and the clock fails, the card is reset so that the transaction is immediately terminated. The main processor recognizes such a condition as being erroneous, logs the error and goes into recovery (e.g., looks at POS registers which indicate that there is no clock).

The main processor knows about the termination of the transaction cycle, through the handshaking signals which dictate all Micro Channel operations between the slave and the master. These signals do not depend on the clock for transmission and may be driven to their default states when the card is reset.

As mentioned above, one of the primary features of the invention is that the adaptor can operate as a master or as a slave with regard to the main processor. With the adaptor as a master, if the clock fails then the cycle is terminated immediately by driving the handshaking signals to their default states (e.g., no hanging up of the bus) when the adaptor is reset. The main processor recognizes that the cycle has been terminated abnormally, logs the error and goes into recovery.

Referring to FIG. 6, the clock circuit is shown in greater detail and includes first and second counters each clocked by a local clock independent of the external clock and reset by the external clock. The terminal count signal of each of the first and second counters are coupled to an OR gate 63. The terminal count value of the first and second counters 61, 62 is each set to a frequency greater than the external clock source. The first counter 61 has a low reset, whereas the second counter 62 has a high reset. The external clock is coupled to the reset of the card. If the external clock malfunctions "high", the first counter will reach terminal count and if the external clock malfunctions "low", then the second counter will reach terminal count. This structure is provided since it is unknown how the external clock will malfunction and the provision of two counters 61, 62 provides for both situations. By the same token, if the external clock is operating properly, it will be resetting the counters faster than the counters can count to their terminal count values. If the counters reach their terminal count values, the clock is either operating very slowly or has stopped completely.

The output of the OR gate 63 is coupled to a reset transmitting means 64 for transmitting the reset condition to the adaptor, whereby the Micro Channel is not left in hung condition if a clock fails, and to a means for logging card status. Thus, a driver for resetting the card and for an input to the POS registers is provided. More specifically, a "RESET" bit in the POS registers, as well as a "CLOCK" bit therein, is set.

Thus, if the first or second counter reaches the terminal switch count, then the card will be reset and "NO CLOCK" will be recorded in the POS registers. If the adaptor is reset, no slave access is permitted except for the recordation of "NO CLOCK" in the POS. Further, since the adaptor is reset, then no master accesses will be started. Any slave or master access in progress is immediately terminated. POS accesses by the main processor 2 do not require the clock and thus the main processor can access the POS registers, even if the clock fails to determine what happened to the clock.

Hence, with the invention, the main processor will not be hung up and this condition is affirmatively provided for by the inventive structure. Further, the inventive structure is novel and unique in that the structure changes conditions on a bus.

Thus, according to the invention, an adaptor is provided which increases flexibility and frees a main processor from having to wait for communications with a high performance switching mechanism, such that the main processor can perform other tasks while the adaptor primarily performs the data transfer tasks. Further, the adaptor is capable of serving as a slave and as a master in data transfer operations. Additionally, the invention provides a method of managing FIFOs of the main processor coupled to a duplex channel of the high performance switch by the adaptor, such that polling across a relatively slow bus does not occur and such that a relatively fast bus is preserved for data transfer operations. Further, a method and structure for ensuring the integrity of the data transferred is provided in which overlapping CRC and parity checking is provided by the inventive design. The invention also provides an improved clock error detection circuit in which hanging up of the main processor is prevented should a clock fail during a data transfer operation.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A clock circuit for an adaptor, said adaptor being coupled between a channel of a main processor and a switching mechanism, said clock circuit comprising:
   a switch clock located in said switching mechanism, said switch clock having an output coupled to said adaptor, said switch clock generating a clock signal having a first state and a second state;
   a counting mechanism in said adaptor including:
   a first input connected to an output of said switch clock for sensing transmission of said clock signal from said first state to said second state,
   a second input connected to said output of said switch clock the sensing a transition of said clock signal the said second state to said first state,
   a counter connected to said first and second inputs for starting counting from an initial value to a terminal value responsive to the sensing of one of the transitions in said clock signal, and
   an output for generating a reset signal responsive to said counter counting to said terminal value, a frequency of said counter being greater than that of said clock signal such that a missing clock signal transition allows said counting mechanism to reach said terminal value;
   reset means, operatively coupled to said output of said counting mechanism, for resetting said adaptor responsive to said reset signal; and
   reset transmitting means, coupled between said reset means and said channel of said main processor, for transmitting a reset condition of said adaptor to said channel, such that said channel avoids being left in a hung condition if a clock signal transition is missed.

2. A clock circuit according to claim 1, wherein said counter comprises first and second counters respectively coupled to said first and second inputs.

3. A clock circuit according to claim 2, wherein said reset means includes an OR gate coupled to said counting mechanism.

4. A clock circuit according to claim 3, wherein said terminal value being reached causes a bus error in said channel.

5. A clock circuit according to claim 3, wherein resetting of said adaptor causes immediate termination of a transaction cycle of data being transferred by said adaptor between said channel and said switching mechanism.

6. A clock circuit according to claim 1, wherein said reset means includes an OR gate coupled to said counting mechanism.

7. A clock circuit according to claim 1, wherein said terminal value being reached causes a bus error in said channel and stops all communication through said channel, and
   said switch clock comprising a single phase clock.

8. A clock circuit for an adaptor, said adaptor being coupled between a channel of a main processor and a switching mechanism, said clock circuit comprising:
   a switch clock located in said switching mechanism, said switch clock having an output coupled to said adaptor, said switch clock generating a clock signal having a first state and a second state;
   a counting mechanism in said adaptor including:
   a first input connected to an output of said switch clock for sensing a transition of said clock signal from said first state to said second state,
   a second input connected to said output of said switch clock for sensing a transition of said clock signal from said second state to said first state,
   a counter connected to said first and second inputs for starting counting from an initial value to a terminal value responsive to the sensing of one of the transitions in said clock signal,
   an output for generating a reset signal responsive to said counter counting to said terminal value, a frequency of said counter being greater than that of said clock signal such that a missing clock signal transition allows said counting mechanism to reach said terminal value; and
   reset means, operatively coupled to said output of said counting mechanism, for resetting said adaptor responsive to said reset signal, such that said channel avoids being left in a hung condition if a clock signal transition is missed.

9. A clock circuit according to claim 8, further comprising reset transmitting means, coupled between said reset means and said channel of said main processor, for transmitting said reset condition of said adaptor to said channel, such that said channel avoids being left in a hung condition if a clock signal transition is missed.

10. A clock circuit according to claim 8, wherein said counter comprises first and second counters respectively coupled to said first and second inputs.

11. A circuit according to claim 8, wherein said reset means includes an OR gate coupled to said counting mechanism.

12. A clock circuit according to claim 8, wherein resetting of said adaptor causes immediate termination of a transaction cycle of data being transferred by said adaptor between said channel and said switching mechanism.

13. A clock circuit according to claim 8, wherein said reset means includes an OR gate coupled to said counting mechanism.

14. A clock circuit according to claim 8, wherein said terminal value being reached causes a bus error in said channel.

15. A clock circuit for an adaptor, said adaptor being coupled between a channel of a main processor and a switching mechanism, said clock circuit comprising:
   a switch clock located in said switching mechanism, said switch clock having an output coupled to said adaptor, said switch clock generating a clock signal having a first state and a second state;
   a counting mechanism in said adaptor including;
   a first input connected to an output of said switch clock for sensing a transition of said clock signal from said first state to said second state,
   a second input connected to said output of said switch clock for sensing a transition of said clock signal from said second state to said first state,
   a counter connected to said first and second inputs for starting counting from an initial value to a terminal value responsive to the sensing of one of the transitions in said clock signal,
   an output for generating a reset signal responsive to said counter counting to said terminal value, a frequency of said counter being greater than that of said clock signal such that a missing clock signal transition allows said counting mechanism to reach said terminal value; and reset means, operatively coupled to said output of said counting mechanism, for resetting said adaptor responsive to said reset signal, wherein said terminal value being reached causes a bus error in said channel and stops all communication through said channel, said switch clock comprising a single phase clock.

16. A clock circuit for use with an adaptor, said adaptor being coupled between a channel of a microprocessor and a switch clock of a switching mechanism, said clock circuit comprising:

first and second counters for respectively receiving first and second inputs from said switch clock, said first and second counters each being set to a predetermined frequency different from a frequency of said switch clock such that an absence of a signal frequency of said switch clock indicates a missing clock and allows at least one of said first and second counters to reach a predetermined terminal count value; and reset means, operatively coupled to said adaptor, for resetting said adaptor upon said at least one of said first and second counters reaching said predetermined terminal count value and transmitting a reset condition of said adaptor indicating said adaptor being reset to said channel, such that said channel avoids being left in a hung condition if a clock signal transition is missed.

17. A clock circuit according to claim 16, further comprising reset transmitting means, coupled between said reset means and said processor channel, for transmitting said reset condition of said adaptor to said channel, such that said channel avoids being left in a hung condition if a clock signal transition is missed.

18. A clock circuit according to claim 17, further comprising a local clock, wherein each of said first and second counters is clocked by said local clock independent of said switch clock.

19. A clock circuit according to claim 18, wherein said switch clock is coupled to said reset of said adaptor.

20. A clock circuit according to claim 19, wherein said first counter has a reset having a first predetermined value and said second counter has a reset having a second predetermined value, wherein, if said switch clock malfunctions at said first predetermined value, said first counter reaches said predetermined terminal count and wherein, if said external clock malfunctions at said second predetermined value, said second counter reaches said predetermined terminal count.

21. A clock fault detection circuit for use with an adaptor, said adaptor being coupled between a channel of a main processor and a switching mechanism, the clock fault detection circuit including:

a clock source external to the adaptor and having an output coupled to said adaptor, the clock source generating a wave having a predetermined shape;

a counting mechanism in the adaptor including:
a first input connected to an output of the clock source for sensing whether the wave has a first predetermined level, a locally generated wave having a predetermined shape and being independent of the clock source, a second input connected to the output of the clock source for sensing whether the wave has a second predetermined level, a plurality of counters, clocked by a locally generated wave having a predetermined shape independent or the clock source, and being connected to the first and second inputs for starting counting from an initial value to a terminal value and an output responsive to at least one of the plurality of counters counting to the terminal value, a frequency of the plurality of counters being greater than a frequency of the wave having the predetermined shape such that a missing clock signal transition allows the counting mechanism to reach the terminal value;

a reset device, operatively coupled to said output of the counting mechanism, for resetting the adaptor: and a reset transmitting device, operatively coupled between the reset device and the main processor, for transmitting the resetting of the adaptor to the main processor, such that the main processor avoids being left in a hung condition if a clock signal transition is missed.

22. A clock fault detection circuit according to claim 21, wherein said predetermined shape of said wave generated by said external source clock and that of said locally generated wave is rectangular.

23. A clock fault detection circuit according to claim 22, wherein said first predetermined level has a value greater than a value of said second predetermined level.

* * * * *

UNITED STATES PATENT AND TRADEMARK OFFICE
CERTIFICATE OF CORRECTION

PATENT NO. : 5,471,488
DATED : Nov. 28, 1995
INVENTOR(S) : Carl A. Bender

It is certified that error appears in the above-indentified patent and that said Letters Patent is hereby corrected as shown below:

| | |
|---|---|
| col. 1, line 36 | Delete "dam" and substitute therefor --data--. |
| col. 2, line 11 | Delete "flees" and substitute therefor --frees--. |
| col. 3, line 54 | Delete "dam" and substitute therefor --data--. |
| col. 3, line 67 | Delete "derailed" and substitute therefor --detailed--. |
| col. 4, line 13 | After "well", insert --as--. |
| col. 7, line 4 | Delete "fight-hand" and substitute therefor --right-hand--. |
| col. 11, line 4 | Delete "flames" and substitute therefor --frames--. |
| col. 13, line 61 | Delete "dam" and substitute therefor --data--. |
| col. 17, line 22 | After "clock" (first), delete "the and substitute therefor --for--. |
| | After "signal", delete "the" and substitute therefor --from--. |

UNITED STATES PATENT AND TRADEMARK OFFICE
CERTIFICATE OF CORRECTION

PATENT NO. : 5,471,488
DATED : Nov. 28, 1995
INVENTOR(S) : Carl A. Bender

It is certified that error appears in the above-indentified patent and that said Letters Patent is hereby corrected as shown below:

col. 20, line 23        Delete "or" and substitute therefor --of--.

Signed and Sealed this

Fourth Day of June, 1996

Attest:

BRUCE LEHMAN

Attesting Officer    Commissioner of Patents and Trademarks